United States Patent [19]

Buening

[11] Patent Number: 5,613,323
[45] Date of Patent: Mar. 25, 1997

[54] CABLE DRIVE ASSEMBLY FOR A WINDOW

[75] Inventor: Dennis J. Buening, Waterford, Mich.

[73] Assignee: Excel Industries, Inc., Elkhart, Ind.

[21] Appl. No.: 374,974

[22] Filed: Jan. 19, 1995

[51] Int. Cl.$^6$ ............................................. E06B 1/00
[52] U.S. Cl. ................................. 49/380; 49/130; 49/360
[58] Field of Search ............................ 49/380, 130, 127, 49/128, 129, 360; 52/207

[56] References Cited

U.S. PATENT DOCUMENTS

| | | | |
|---|---|---|---|
| 2,992,460 | 7/1961 | Hentges | 49/130 |
| 4,561,224 | 12/1985 | Jelens | 49/130 |
| 4,850,139 | 7/1989 | Tiesler . | |
| 4,887,390 | 12/1989 | Boyko et al. | 49/360 X |
| 4,920,698 | 5/1990 | Friese et al. . | |
| 4,932,715 | 6/1990 | Kramer | 49/360 X |
| 4,995,195 | 2/1991 | Olberding et al. | 49/380 X |
| 5,046,283 | 9/1991 | Compeau et al. | 49/360 X |
| 5,146,712 | 9/1992 | Hlavaty | 49/360 X |
| 5,345,717 | 9/1994 | Mori et al. | 49/380 X |

FOREIGN PATENT DOCUMENTS 452535  8/1936  United Kingdom ............ 49/130

*Primary Examiner*—Philip C. Kannan
*Attorney, Agent, or Firm*—Banner & Witcoff, Ltd.

[57] ABSTRACT

A window assembly for a motor vehicle body enclosing a passenger compartment has a structural frame mounting a sliding pane. Guide means are provided for guiding the sliding pane as it slides between its open and closed positions. The guide means includes kick-out means for forcibly guiding the sliding pane toward an offset, substantially parallel plane upon initial movement of the sliding pane from its closed position toward its open position. Such initial offset facilitates mounting of the sliding pane in its closed position in a plane substantially flush with an adjacent fixed position pane or other object of the window assembly of the vehicle body. Pull/pull type drive means are provided for operating the sliding pane. Specifically, a cable-and-drum drive mechanism of the window assembly includes a drive cable wrapped around a drive drum and attached to the sliding pane. The sliding pane is pulled open by rotation of the drive drum in a first rotational direction and is pulled closed by reverse rotation of the drive drum. The drive drum is rotatable mounted in a recess in the frame of the window assembly and at least a portion of the drive cable extends from the sliding pane to the drive drum in a cable channel within the frame.

18 Claims, 8 Drawing Sheets

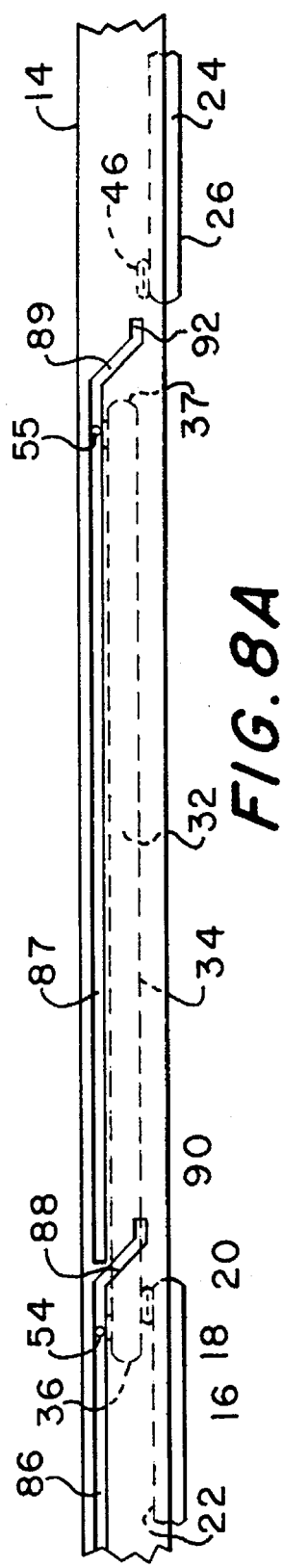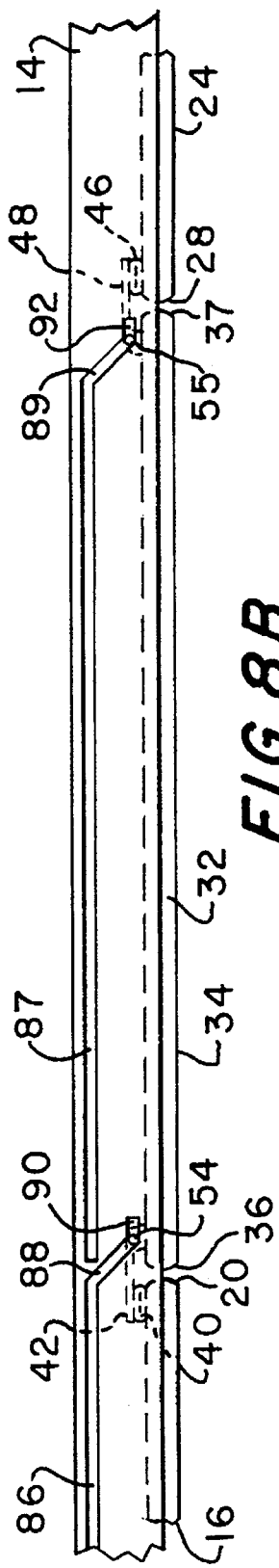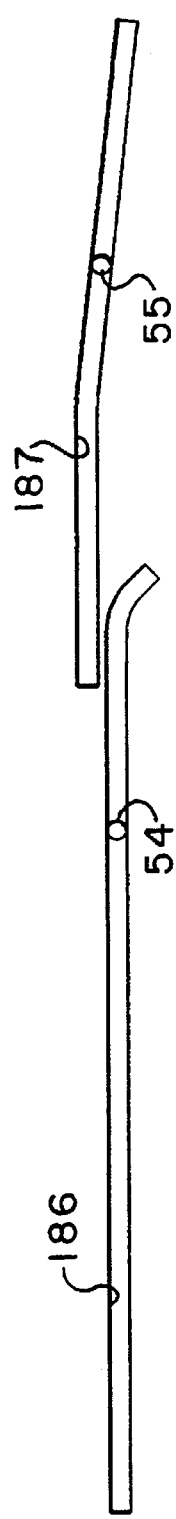

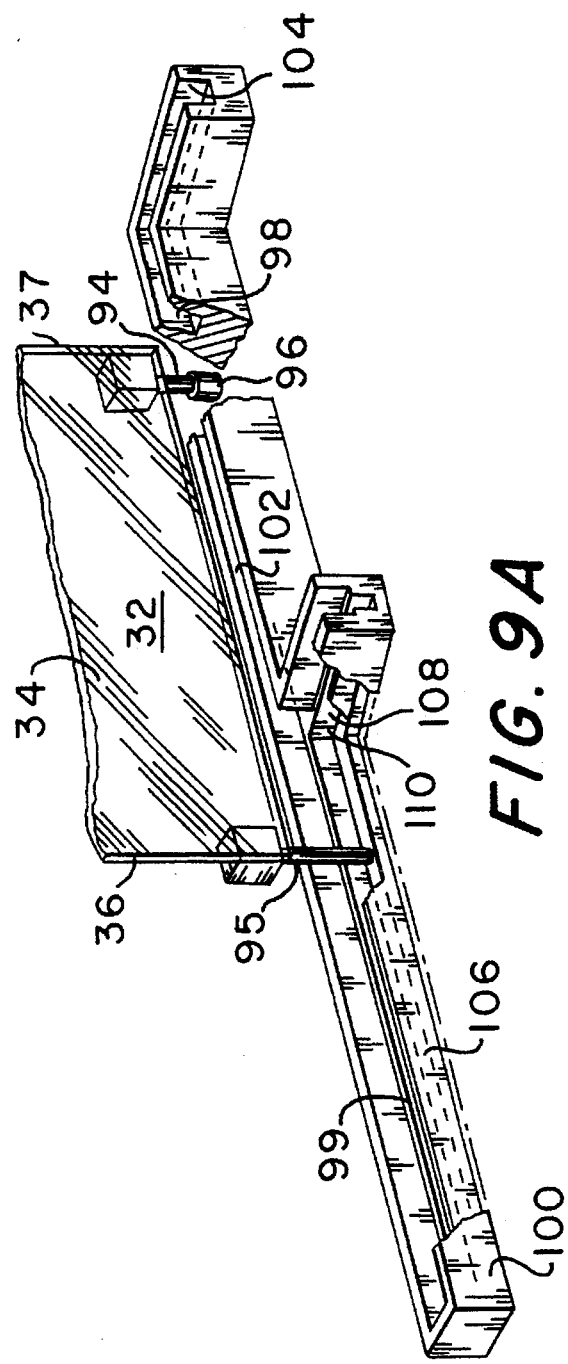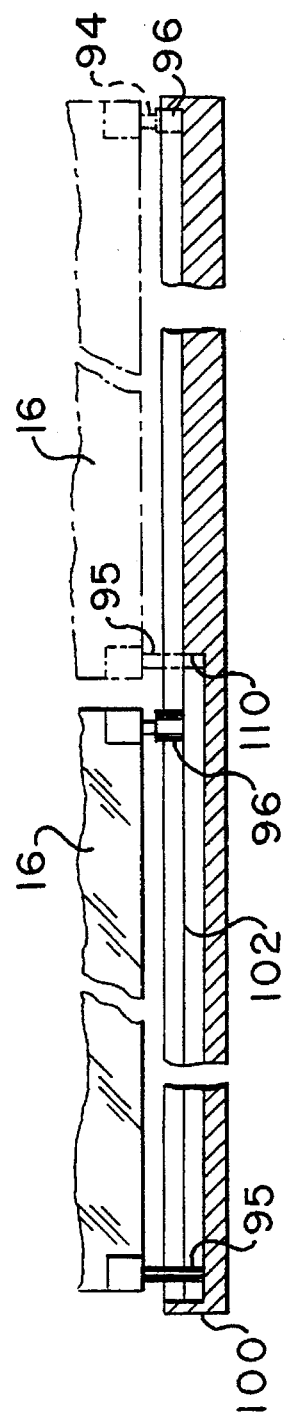

CABLE DRIVE ASSEMBLY FOR A WINDOW

INTRODUCTION

The present invention is directed to a cable drive arrangement for a motor vehicle window assembly and, more particularly, to a pull/pull type cable drive mechanism for a window assembly in which a sliding pane is pulled to its closed position, which may be substantially flush with one or more adjacent fixed-position panes, and is pulled to its open position, in an offset, substantially parallel plane.

BACKGROUND

Motor vehicle window assemblies having one or more sliding panes frequently are preassembled prior to installation. Preassembly for simple insertion into a window opening in the vehicle body during vehicle assembly has been found to yield substantial cost and quality advantages. Such window assemblies typically include a metal or plastic frame to which the glass or plastic panes are mounted. The frame may be formed in place around the perimeter of the transparent panes. Such window assemblies intended for use as rear windows for pickup truck cabs, for example, typically include a frame holding one or more fixed panes and a sliding pane.

As the exterior surfaces of vehicles, including pickup trucks and the like, have grown progressively smoother and more aerodynamic, a need has developed for window assemblies suitable to present a correspondingly more integrated and flush appearance. In particular, it has become desirable to provide multi-pane window assemblies wherein at least one pane is slidably mounted, which can be integrated into a recessed window opening to provide a substantially flush overall appearance.

A window assembly for a vehicle having a flush sliding pane is shown in U.S. Pat. No. 4,850,139 to Tiesler. In the Tiesler design the sliding window is manually operated and slides in slots having wider-width portions. The wider-width portions of the slots are provided to permit one side of the sliding pane to be pulled manually out of flushness with the adjacent fixed panes and thereafter slid laterally behind an adjacent fixed pane. No power drive mechanism is suggested, and the complexity of first pulling one side of the window out of flushness followed by delayed lateral sliding would require a correspondingly complicated drive mechanism with consequent cost and reliability disadvantages.

Preassembled multi-pane window assemblies are shown in U.S. Pat. No. 4,920,698 to Friese et al. The Friese et al window assemblies are replacements for the OEM (original equipment manufacturer) window assembly originally included in a vehicle when it was new. The Friese et al window assembly includes right and left side fixed panes and a sliding center pane powered by an electric motor. In the powered sliding truck cab window assembly of Friese et al, however, the center pane is not flush with the side panes. Rather it is recessed inward toward the passenger compartment of the truck, such that it can slide laterally behind one or the other of the fixed panes to open the window. Thus, the center sliding pane does not contribute to an overall flush appearance.

In addition, the powered sliding truck cab window of the Friese et al patent discloses undesirably complex mechanisms for delivering drive power from an electric motor to slide the sliding pane between its open and closed positions. It shows, for example, a rack and pinion gear arrangement not well suited for use in powering a sliding pane which must travel not only laterally from a closed position to an open position behind an adjacent fixed pane, but also must be first off-set from a position flush with the adjacent pane when closed, i.e., toward a parallel plane for sliding to its open position. A push/pull drive cable arrangement also is shown. An interior cable cooperates with an outer sheath to drive the sliding pane through the intermediary action of a transmission mechanism which retracts or pushes out the interior cable upon actuation by the drive motor. Such push/pull cable arrangements present limitations as to the force which can be transmitted without buckling the cable. Also, such complex drive arrangements for sliding windows may present reliability concerns and increased manufacture, installation and repair costs. It would be highly desirable for meeting increasingly stringent OEM requirements of the major motor vehicle manufacturers to have a reliable, less complex drive system for a sliding window assembly, especially a sliding window assembly wherein the sliding pane in its closed position is flush with the adjacent fixed pane(s).

It is an object of the present invention to provide improved, pull/pull cable drives for multi-pane modular window assemblies having slidably mounted panes. Additional objects and optional features of the invention will be apparent from the following disclosure and detailed discussion of preferred embodiments.

SUMMARY

In accordance with a first aspect, a window assembly for a motor vehicle has a frame for mounting in a window opening in the vehicle body, comprising at least one structurally self-supporting frame member. Typically, a full-circumference frame member, optionally with intermediate bridging portions, is provided as a single unitary member formed by reaction injection molding or other plastic molding technique. Various brackets, cover plates, fixturing devices and the like, generally will be mounted to such unitary frame member. Unitary weather seals, such as disclosed in commonly-owned U.S. Pat. No. 5,154,028, can be provided as a radially outward extension of the frame to abut sidewalls of the motor vehicle window recess.

At least one sliding pane is mounted to the frame for sliding between a closed position in one plane and an open position in an offset second plane substantially parallel to the first plane. That is, in sliding back and forth between its open and closed positions, the sliding pane moves both laterally and in a direction normal to such lateral sliding, typically inward into the passenger compartment when opening the window. The term "lateral" is used here broadly to mean movement approximately in the plane of the sliding pane. Thus, lateral movement would be horizontally right-to-left or left-to-right for a typical pick-up truck backlite, as viewed from the front or rear of the truck. Lateral sliding would be fore-and-aft for a typical side window of a vehicle. It could also be up-and-down sliding. In all such examples, the sliding pane in windows of the present invention move in a direction normal to such lateral sliding, outward or more typically inward, substantially simultaneously with at least initial lateral movement from the closed position.

Guide means are provided for guiding the sliding pane as it moves between its open and closed positions, preferably at all times being substantially constrained in the direction normal to lateral sliding within tolerances suitable to permit smooth sliding. The guide means comprises kick-out means for forcibly guiding the sliding pane from the first plane toward the second, offset plane substantially simultaneously with the initial lateral movement of the sliding pane from its closed position toward its open position. The guide means preferably comprises guide channels provided either by the frame or the sliding pane, and fixed pins or the like mounted to the other of the frame and sliding pane and extending into the guide channels. The kick-out means is preferably then provided as a feature or apparatus to interact with the fixed pins as the sliding pane is moved. Such kick-out means preferably may comprise, for example, ramp surfaces, optionally forming a portion of the guide channel surface, movably mounted cams and the like.

A pull/pull cable-and-drum drive assembly is provided, in which a drive cable attached to the sliding pane is wrapped around a reversibly driven drive drum. Rotation of the drive drum in one direction pulls the cable to pull open the sliding pane. Rotation of the drive drum in the opposite direction pulls the cable likewise in the opposite direction to pull the sliding pane to its closed position. The drive drum is rotatably mounted in a recess in the frame. At least a portion of the drive cable extends between the drive drum and the sliding pane in a cable channel in the frame means. Preferably, for a pick-up truck backlite, for example, as further disclosed and discussed below, a first segment of the cable for pulling the sliding pane open extends in a first cable channel in a horizontal portion of the frame and a second segment of the cable for pulling the sliding pane closed extends in a second, separate cable channel running parallel the first channel in the horizontal portion of the frame.

It is a significant advantage provided by the motor vehicle window assemblies disclosed here, that the sliding pane is forcibly guided from its closed position toward its open position in an offset parallel plane substantially simultaneously with initial movement of the sliding pane from its closed position. This feature, in cooperation with others of the novel window assemblies, permits the sliding pane to be constrained in a direction normal to the plane of the sliding pane at all points along its path of travel between the open and closed positions. Furthermore, the window assembly is readily adapted to be used in conjunction with drive means, such as a hand crank or, more preferably, an electric motor actuated from within the passenger compartment. Drive force can be provided to pull the sliding pane open along a single defined path of travel without the need for first separately pulling the sliding pane toward its offset plane prior to initiation of lateral sliding. Considerable simplification is thus achieved in the drive means for the window assembly, with consequent cost savings and increased reliability.

It is an additional advantage that the novel drive assemblies disclosed here are well-suited for window assemblies mounted into a recessed window opening in a motor vehicle body to provide an appearance of being substantially flush with the sheet metal or other vehicle body panels surrounding the window opening. Sliding panes which in their closed position are flush with an adjacent fixed-position pane or other object, can nevertheless be slid open to an offset plane, perhaps behind the adjacent fixed-position pane, via a single, smooth path of travel.

As used here, any plane or surface which lies in a plane may be either flat or curvoplaner, as that term is understood by those who are skilled in the art, that is, by those who are knowledgeable regarding this area of technology. The exterior surface of the sliding pane will be considered substantially flush with that of an adjacent fixed pane in the window assembly if it follows a common curved plane. Such surfaces also are substantially flush, as that term is used here, if they have a generally flush appearance within the standards of the motor vehicle manufacturer. Thus, for example, in the case of a pickup truck rear window assembly, the exposed exterior surface of the sliding pane will be substantially flush with the curvoplaner surface of adjacent fixed-position panes, if it is within about one centimeter or, more preferably, one-half centimeter, most preferably within about two millimeters, of an imaginary extension of the curved plane of the fixed-position panes. More generally, substantially flush means that the exterior surface of the sliding pane meets the specifications of the motor vehicle manufacturer for a substantially flush appearance for the intended application of the window assembly.

Additional features and advantages of various preferred embodiments will be better understood from the following detailed discussion.

BRIEF DESCRIPTION OF THE DRAWINGS

Certain preferred embodiments are described in detail below with reference to the appended drawings wherein:

FIGS. 8A and 8B are schematic views, partially in section and partially broken away, of the fixed-position panes and center sliding pane of the window assembly of FIGS. 1–3, illustrating a third alternative embodiment of the guide means for guiding the sliding pane as it moves between its open position (FIG. 8A) and closed position (FIG. 8B);

FIG. 8C is a schematic view, partially broken away, of an alternative preferred embodiment, showing guide pins in guide channels which provide overlapping travel ranges and more gradual offset;

FIG. 9A is a schematic perspective view, partially in section and partially broken away, showing another alternative embodiment of the guide means for the window assembly of FIGS. 1–3;

FIG. 9B is a schematic elevation view, partially in section and partially broken away, of the embodiment of FIG. 9A;

Figure 1:
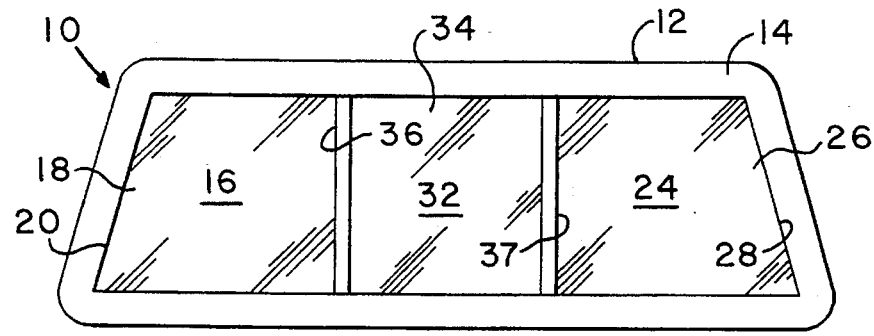
FIG. 1 is a schematic elevation view of a window assembly incorporating a sliding pane in accordance with a first preferred embodiment.

The figures referred to above are not drawn necessarily to scale and should be understood to present a simplified representation of the invention, illustrative of the basic principles involved. The same reference numbers are used in the drawings for similar or identical components and features shown in various alternative embodiments. Window assemblies incorporating flush sliders as disclosed above, will have configurations and components determined, in part, by the intended application and use environment. Some features of the window assembly depicted in the accompanying figures have been enlarged or distorted relative to others to facilitate visualization and understanding. In particular, for example, thin features may be thickened and long features may be shortened. Directional references used below are for a window assembly mounted as the rear window in the cab or passenger compartment of a motor vehicle, such as a pickup truck or the like. An interior surface of the window faces into the passenger compartment. An exterior surface faces rearward of the vehicle. The lateral directions are right and left as one faces from the back to the front of the vehicle. The term "forward" means toward the front of the vehicle, "rearward" means toward the rear of the vehicle, "right-side" and "left-side" are as viewed from the rear of the vehicle, "outward" or "exterior" refers to a direction or position outwardly of the passenger compartment, and "inward" or "interior" refers to a direction toward or into the passenger compartment of the vehicle.

DETAILED DESCRIPTION OF CERTAIN PREFERRED EMBODIMENTS

The novel flush-closing multi-pane window assemblies disclosed here can have one or more fixed panes and one or more sliding panes. The window assembly can be configured for use as a truck cab backlite, as a motor vehicle sidelite etc. The sliding pane(s) can slide up and down, side-to-side, etc., and can be adapted to be driven by electric motor, hand crank, etc., using the pull/pull cable arrangement disclosed above between the sliding pane and the drive means. The detailed discussion below will focus primarily on embodiments of the window assembly intended for use as a pickup truck backlite with a single center sliding pane between right- and left-side fixed-position panes. In view of this discussion and disclosure, those who are skilled in the art will be readily able to apply its general principles in alternative motor vehicle applications, such as motor vehicle sidelites, window assemblies with vertically sliding panes, etc.

Figure 2:
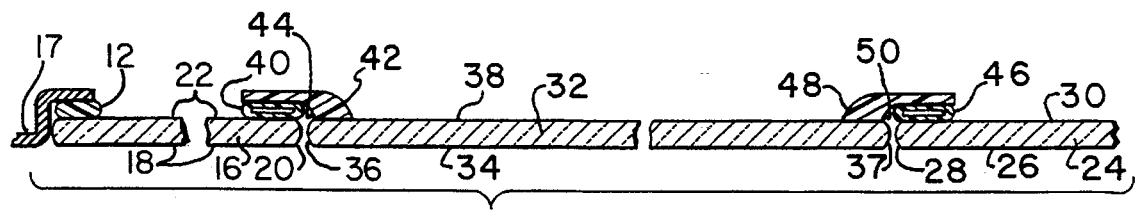
FIG. 2 is an enlarged section view showing the relative positioning of the fixed-position panes of the window assembly of FIG. 1, together with the center sliding pane in its closed position, along with selected other componentry of the assembly.
Figure 3:
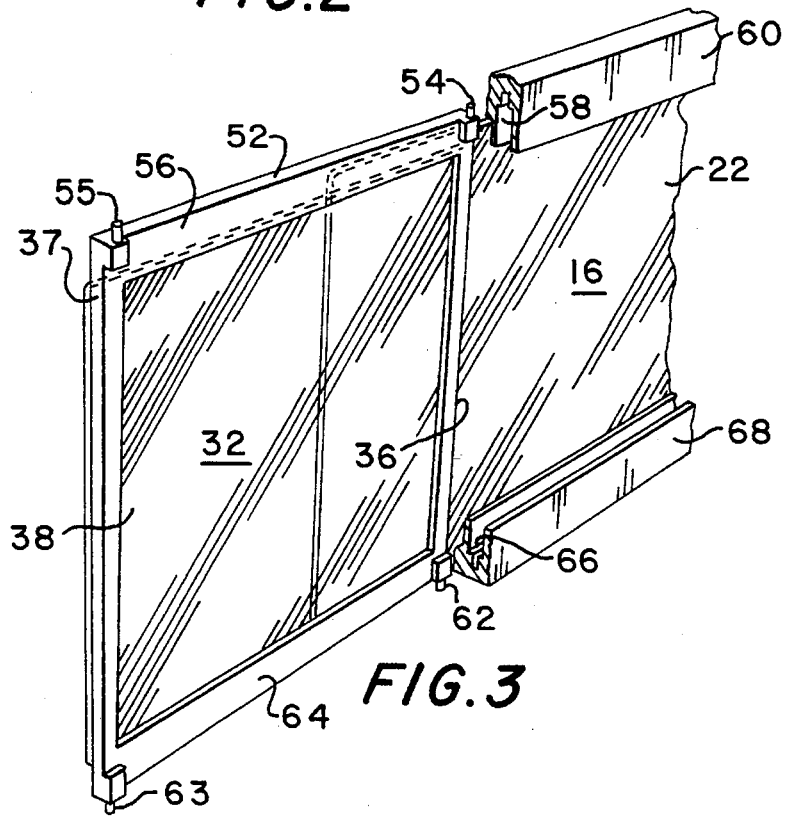
FIG. 3 is a schematic interior perspective view, partially broken away, of a window assembly in accordance with an alternative preferred embodiment.

Referring now to FIGS. 1–3, a window assembly 10 is seen to comprise a structurally self-supporting frame 12 which includes a full-circumference one-piece molded plastic frame member 14. The frame is full-circumference in the sense that it forms an unbroken ring of molded plastic material about the outer perimeter of the assembly. The continuous one-piece frame is advantageous in facilitating mounting and sealing with the window assembly into a recessed window opening in the motor vehicle body. A left-side fixed pane 16 is mounted to the frame 12. It has an exterior surface 18, a perimeter edge 20 and an inside surface 22. Similarly, right-side fixed pane 24 has an outer surface 26, a perimeter edge 28 and an inside surface 30. A center sliding pane 32 is mounted in the opening between the two fixed panes. Center sliding pane 32 has an exterior surface 34 which, as best seen in FIG. 2, is substantially flush with the exterior surfaces of the fixed panes when the sliding pane is in its closed position. It can be seen that the left-side vertical perimeter edge 36 of the sliding pane, in the closed position illustrated in FIG. 2, lies in alignment with, and in close proximity to, perimeter edge 20 of fixed pane 16. Similarly, right-side perimeter edge 37 of sliding pane 32 is aligned with and closely proximate to perimeter edge 28 of the right-side fixed pane 24.

Weather sealing can be provided at the upper and lower horizontal edges of sliding pane 32 in accordance with known techniques including, for example, the use of blade seals affixed to the frame 12, etc. In accordance with one preferred embodiment, weather sealing along the right- and left-side vertical edges of sliding pane 32 is provided by O-seals. Specifically, a left O-seal 40 is adhesively or otherwise affixed vertically to inside surface 22 of left-side fixed pane 16 at its periphery adjacent the sliding pane. A sealing flange 42 extends vertically along the periphery of inside surface 38 of sliding pane 32, and provides a sealing flange 44 which overlies, contacts and partially compresses O-seal 40. Similarly, another vertically-extending sealing flange 48 is affixed to the opposite periphery of the inside surface 38 of sliding pane 32, providing a sealing surface 50 which overlaps, contacts and partially compresses right-side O-seal 46, which is affixed along the vertical periphery of inside surface 30 of right-side fixed pane 24. An O-seal typically is provided as a length of resilient material having a round or oval cross section with an open center.

Figure 12:
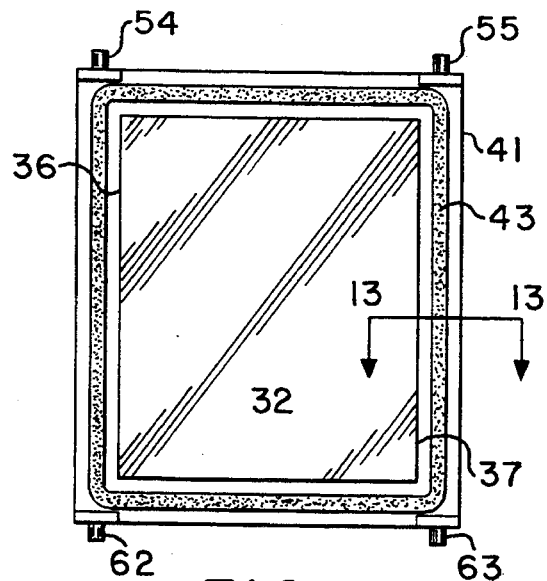
FIG. 12 is a schematic elevation view of a sliding pane sub-assembly in accordance with an alternative preferred embodiment.
Figure 13:
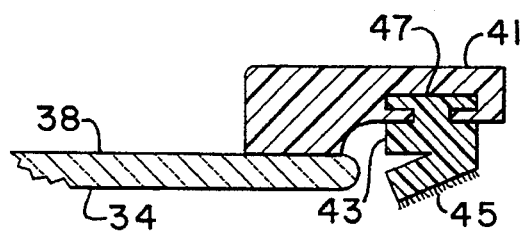
FIG. 13 is an enlarged section view taken through lines 13—13 of FIG. 12.

In an alternative preferred embodiment, a weather seal is provided as a single, substantially continuous, full-circumference blade seal mounted around the perimeter of the sliding pane. Most preferably, the sliding pane sub-assembly provides a single sealing flange 44, much like flanges 42 and 48 but which extends around the entire inside perimeter of the sliding pane 32. The sealing flange preferably is formed of molded plastic, such as PVC, RIM, etc., most preferably being molded in place directly onto the surface of the sliding pane in accordance with known techniques. As seen in FIGS. 12 and 13, full-circumference flange 41 extends beyond the perimeter of the glass 32 and carries full-circumference blade seal 43. The blade seal preferably is an extruded or otherwise molded member formed of natural or synthetic rubber, EPDM or other suitable material. It can be mounted as a single, continuous strip or in multiple pieces. Preferably its surface 45 which forms sealing contact with adjacent fixed panes or other surfaces of the window assembly is flocked in accordance with known techniques, to improve sliding contact as the sliding pane moves into and out of its closed position. The blade seal 43 can be mounted to the flange 41 in any suitable manner, including adhesively. In the preferred embodiment shown, blade seal 43 includes flanged mounting base 47 which slips into a correspondingly shaped recess in flange 41. This arrangement is found to provide ease of assembly and replacement. Alternative sealing materials and techniques will be readily apparent to those skilled in the art in view of the present disclosure.

The sliding pane optionally is provided as a subassembly comprising not only the transparent glazing panel of glass, plastic or a laminate thereof, but also a frame of molded plastic or the like extending partially or completely around the perimeter of the glazing panel. A subassembly of this type is illustrated in the alternative embodiment shown in FIG. 3. Thus, sliding pane 32 is shown in FIG. 3 to have perimeter rim frame 52. The left-side perimeter edge 36 of the sliding pane is provided as the exposed left-side vertical surface of rim frame 52. (This edge surface appears at the right side of sliding pane 32 in FIG. 3, since FIG. 3 is a view from inside the passenger compartment.) Similarly, the vertical right edge of rim frame 52 provides perimeter edge 37 of the sliding pane. Alternatively, the perimeter edge of glass may be retained in the sliding pane subassembly, as a "raw" edge, i.e., an exposed surface, as in FIGS. 12 and 13 for example. It will be well within the ability of those skilled in the art to employ features or components additional or alternative to those described herein. Locking means, for example, may be provided, such as locking latch means mounted on the inside surface of the sliding pane or elsewhere in the window assembly, or numerous other well known locking means may be employed.

As indicated above, it is a significant advantage of the present invention that guide means are provided for the sliding pane, comprising kick-out means for forcibly offsetting the sliding pane from its closed position plane toward a substantially parallel plane substantially simultaneously with the initial lateral movement of the sliding pane toward its open position. Preferably, the guide means employs fixed members extending from the sliding pane or from the frame, and corresponding guide channels in the other of them to receive the fixed members. The fixed members, most preferably, extend from the sliding pane, as in the embodiment illustrated in FIG. 3 and, correspondingly, the guide channels are provided in the frame. More specifically, sliding pane 32 is seen in FIG. 3 to have upper pins 54 and 55 (being left-side and right-side pins, respectively, as viewed from outside the vehicle) extending upwardly from upper horizontal member 56 of rim frame 52 into upper guide channel 58 in upper, horizontally-extending frame portion 60. Similarly, lower pins 62 and 63 extend downwardly below the sliding pane 32 from a lower horizontal portion 64 of rim frame 52, into a lower guide channel 66 provided in a horizontally-extending lower frame portion 68. The pins preferably are spring loaded or otherwise biased in the vertical direction to reduce or eliminate window rattle. Only the top pins or, more preferably, the bottom pins need be biased. This preferred feature is found to aid also in simplifying the assembly and disassembly of the window, by permitting the pins to be retracted to enter or escape the guide channels. It can be seen that the guide channel are formed simply as a recess in the frame members. Alternatively, auxiliary brackets or appliques may be added to the frame to form the guide channels, perhaps in cooperation with the main body of the frame. Also, channel liners, such as U-shaped inserts, may be used to more easily control sliding friction, channel dimensions, etc. Also, as noted above, blade seals and other known components may be added.

Figure 4A:
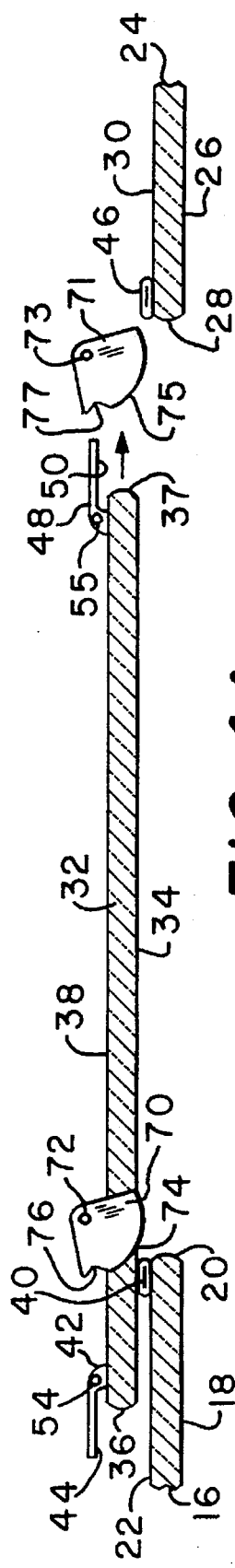
FIGS. 4A and 4B are schematic sectional views of the fixed-position panes and center sliding pane of the window assembly of FIGS. 1–3, illustrating a first alternative embodiment of the guide means for guiding the sliding pane as it moves between its open position (FIG. 4A) and closed position (FIG. 4B)
Figure 4B:
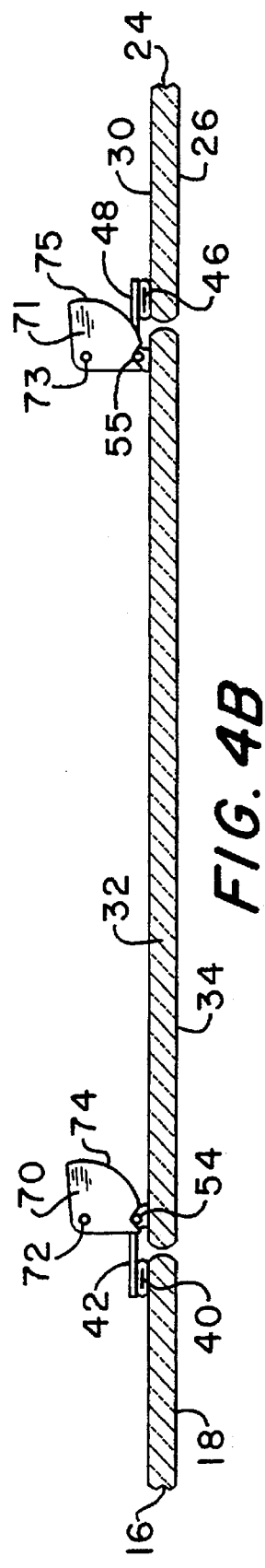

The kick-out means, most preferably, is provided by the frame, although it alternatively can be carried by the sliding pane, particularly in those embodiments in which the fixed pins extend from the frame. A first preferred embodiment of kick-out means provided by the frame for engaging fixed members such as the guide pins shown in FIG. 3, is illustrated in FIGS. 4A and 4B. Specifically, the kick-out means is seen to comprise pivoting cams mounted for arcuate movement in a plane substantially perpendicular to the sliding pane. Left-side upper cam 70 is mounted on pivot pin 72, and right-side upper cam 71 is similarly mounted on pivot pin 73. A corresponding pair of pivoting cams would be mounted to the frame at the bottom of the sliding pane. Each such cam is seen to provide a notch. Specifically, cam surface 74 of left-side cam 70 provides notch 76 to engage guide pin 54 of the sliding pane. Cam surface 75 of the right-side cam 71 provides notch 77 to engage guide pin 55. In FIG. 4A, sliding pane 32 has been moved out of its closed position and, therefore, is in an offset, parallel plane. As it is moved to the right, that is, toward its closed position, guide pin 54 will be captured by cam notch 76, and guide pin 55 will be captured by cam notch 77. At that point, the perimeter edge surfaces of the sliding pane preferably will have just cleared their overlap with the adjacent fixed-position pane. Further movement of the sliding pane toward its closed position will require counterclockwise rotation (as viewed in FIGS. 4A and 4B) of the cams, thereby forcing the guide pins outward. As seen in FIG. 4B, when the sliding pane has been moved fully to the right, the cams have acted upon the guide pins to cause the sliding pane to simultaneously have been moved outward to a plane flush with the adjacent fixed-position panes.

Figure 5:
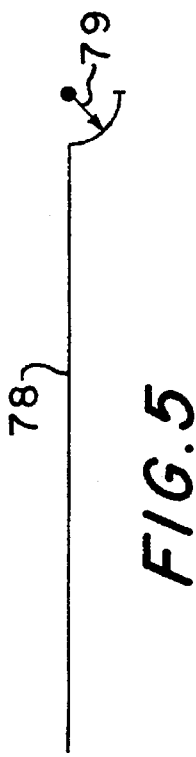
FIG. 5 shows the path of travel followed by the sliding pane of FIGS. 4A and 4B as it moves between its open and closed positions.

This operation is performed in reverse upon initial movement of the sliding pane from its closed position toward its open position. Such "initial movement" of the sliding pane from its closed position typically will involve a distance of at least the first few inches of travel. Preferably, the kick-out means engages the fixed members, causing offsetting motion of the sliding pane simultaneously with lateral sliding motion, for a distance of lateral travel at least equal to the offset distance. The offset distance is the distance between the plane occupied by the sliding pane in its closed position and the substantially parallel offset plane occupied by the sliding pane in its open position. The rate of kick-out or offset would thus not be substantially greater than about one-to-one, defined as the ratio of offset travel distance to lateral travel distance. The path of travel 78 for the embodiment of FIGS. 4A, 4B is shown in FIG. 5. Travel path 78 includes an initial portion having a radius 79, controlled by the action of the pivoting cams.

It should be understood that the guide pins of sliding pane 32 in the preferred embodiment of FIGS. 4A and 4B, preferably are controlled not only by engagement with the pivoting cams during initial movement from the closed position, but at all times also by guide channels provided in the frame, dimensioned to closely fit the size of the guide pins, with tolerances suitable to permit smooth sliding. In this way, the sliding pane is not permitted free movement at any point along its path of travel between its open and closed positions. This is particularly significant for avoiding window rattle and the like, which is generally unacceptable in modern motor vehicles.

Figure 6A:
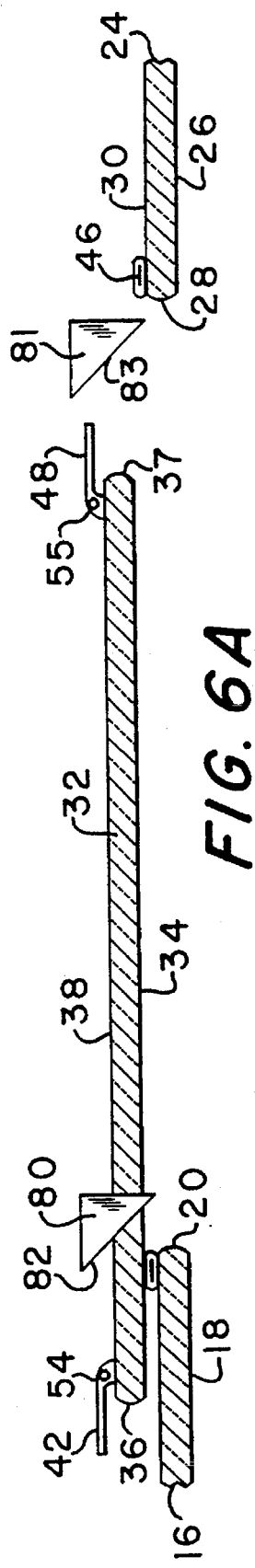
FIGS. 6A and 6B are schematic sectional views of the fixed-position panes and center sliding pane of the window assembly of FIGS. 1–3, illustrating a second alternative embodiment of the guide means for guiding the sliding pane as it moves between its open position (FIG. 6A) and its closed position (FIG. 6B)
Figure 6B:
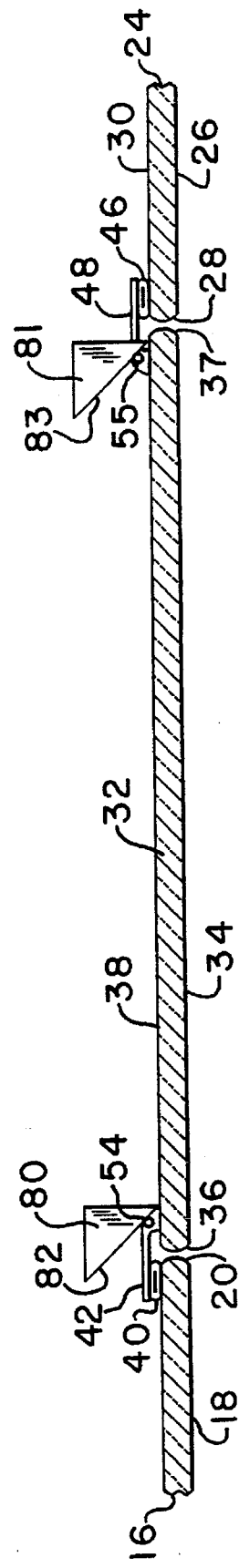
Figure 7:
FIG. 7 shows the path of travel followed by the sliding pane of the embodiment of FIGS. 6A and 6B as it moves between its open and closed positions.

In an alternative embodiment illustrated in FIGS. 6A and 6B, the kick-out means comprises guide ramps 80 and 81 (and corresponding lower guide ramps) to engage guide pins 54 and 55, respectively. More specifically, guide ramp 80 provides ramp surface 82 which engages guide pin 54 substantially simultaneously as ramp surface 83 of guide ramp 81 engages guide pin 55 at the opposite side of sliding pane 32. Thus, as the sliding pane 32 is moved from its partially open position shown in FIG. 6A to its closed position shown in FIG. 6B, it is forced outwardly to a plane flush with the adjacent fixed-position panes 16 and 24 by interaction of the guide ramps with the guide pins. It can be seen that in this embodiment the sliding pane would have approximately a one-to-one rate of offset during its initial movement from its closed position. The rate of offset could, of course, be adjusted by changing the angle of the guide surfaces 82 and 83 relative the plane of the sliding pane. It is significant that in the embodiment of FIGS. 6A and 6B, as in the embodiment of FIGS. 4A and 4B, the kick-out means maintains engagement with the fixed members, i.e., the guide pins, when the sliding pane is fully in its closed position, to help resist window rattle and the like. FIG. 7 shows the path of travel 84, including initial portion 85, for the sliding pane 32 in the embodiment of FIGS. 6A and 6B.

Kick-out means in the form of guide ramps, preferably are provided as portions of guide channels formed in the upper and lower frame members, as in the embodiment shown in FIGS. 8A and 8B. A left-side upper guide channel 86 is shown to incorporate ramp surface 88 and right-side upper guide channel 87 correspondingly incorporates ramp surface 89. Like guide channels would, of course, be provided in the lower horizontal portion of the frame. Guide pin receiving sockets 90 and 92 are provided at the ends of ramp surfaces 88 and 89, respectively. The guide pins merely seat into such sockets as the sliding pane reaches its closed position, as seen in FIG. 8B. The sockets are dimensioned to permit essentially no inward offsetting travel except simultaneously with lateral travel as the sliding pane is moved toward its open position.

In this regard, it is optional that both vertical edges of the sliding pane be offset substantially symmetrically and simultaneously during initial movement of the sliding pane from its closed position. Thus, in the embodiments shown in FIGS. 4A, 4B, 6A, 6B, and 8A, 8B, opposite vertical edges 36 and 37 of the sliding pane each follows the same path of travel. Alternatively, however, it is possible to aggressively offset only the leading edge of the sliding pane (i.e., left edge 36, as viewed in FIGS. 4A and 4B) upon initial lateral travel, allowing the trailing edge (i.e., opposite edge 37) to follow a less aggressive path of travel. That is, the trailing edge would be more gradually offset in the sense of being offset a shorter distance per unit of lateral travel distance. FIG. 8C shows a pin and guide channel arrangement which is a modification of that seen in FIGS. 8A, 8B. In FIG. 8C the leading edge follows a more aggressive offset than does the trailing edge. Left-side upper guide channel 186 receiving upper pin 54 is substantially the same as channel 86 in FIGS. 8A, 8B. Right-side upper guide channel 187, however, offsets more gradually. Advantageously in this embodiment, when the sliding pane is in its closed position, the upper and lower guide pins at the trailing edge are provided enhanced support by the guide channel wall against inward force. Guide channel 187 is seen to extend behind channel 186, as discussed further below.

In the embodiment illustrated in FIGS. 8A and 8B, the sliding pane could not be moved leftward to entirely clear the center opening, since guide channel 87 must stop at the point where guide channel 86 begins. Thus, guide channel 55 cannot be moved sufficiently to the left to place the sliding pane fully behind fixed pane 16. A slightly different alternative embodiment is illustrated in FIGS. 9A and 9B, wherein guide pins of different lengths are used with guide channels of correspondingly different depths to facilitate sliding the center pane completely behind fixed-position pane 16 to fully open the window. FIGS. 9A and 9B show the lower guide pins on sliding pane 32. Left guide pin 94 is received in left guide channel 98, formed in a lower horizontal guide channel bracket 100, which would be affixed to, and be a part of, a lower horizontal portion of the window assembly frame. Right-side guide pin 95 is longer than pin 94 and is received in right-side guide channel 99, which is correspondingly deeper than left guide channel 98. The left guide channel 98 has a main laterally-extending portion 102, which terminates in an offset "ramp surface" portion 104, formed as a unitary extension. In this regard, the embodiment of FIGS. 9A and 9B is similar to that of FIGS. 6A and 68 and FIGS. 8A and 8B. Right-side guide channel 99 similarly has a main laterally-extending portion 106 which terminates in an offset "ramp surface" portion 108. The action of ramp surface 108 on guide pin 95, along with the action of ramp surface 104 on guide pin 94, will bring sliding pane 32 outwardly to a plane flush with the adjacent fixed panes as the sliding pane reaches its closed position. Sliding pane 32 can be fully opened, however, since guide channel 98 does not terminate at the point where guide channel 99 begins. Rather, it extends in common with guide channel 99. No risk is created that guide pin 95 will accidentally enter the main lateral portion 102 of guide channel 98, because it cannot pass step 110. That is, guide pin 95 is too long to enter guide ramp 98. Optionally, guide ramp 98 in addition to being less deep than guide ramp 99, also can be wider or more narrow. If wider, a pin fitting 96 can be provided on guide pin 94 to prevent window rattle and the like. Also, a ramped or funneled opening can be provided at the end of guide channel 98 to facilitate reentry of guide pin 94 as it passes step 110 during closure of the sliding pane.

It should be recognized, that the embodiment illustrated in FIG. 8C permits full opening of the sliding pane also, without the dual-depth channels of the embodiment of FIGS. 9A, 9B. In the embodiment of FIG. 8C, as mentioned above, the right-side channel 187 is moved inwardly and extends behind (i.e., inside of) left-side channel 186. This may require a wider frame member, at least in the area where the channels overlap. The sliding pane in its open position may be slightly angled to the fixed position pane (although still substantially parallel to it) as a result of channel 187 being extended behind channel 186. Alternatively, channel 187 can simply be offset inwardly along its entire length. The guide pins travelling in channel 187 and the corresponding lower channel in that case preferably are offset inwardly also. While a somewhat thicker frame and a somewhat thicker sliding pane subassembly may be required to accommodate such arrangement, full lateral travel can be achieved with the sliding pane parallel to the adjacent fixed pane in both its open and closed positions.

Figure 10:
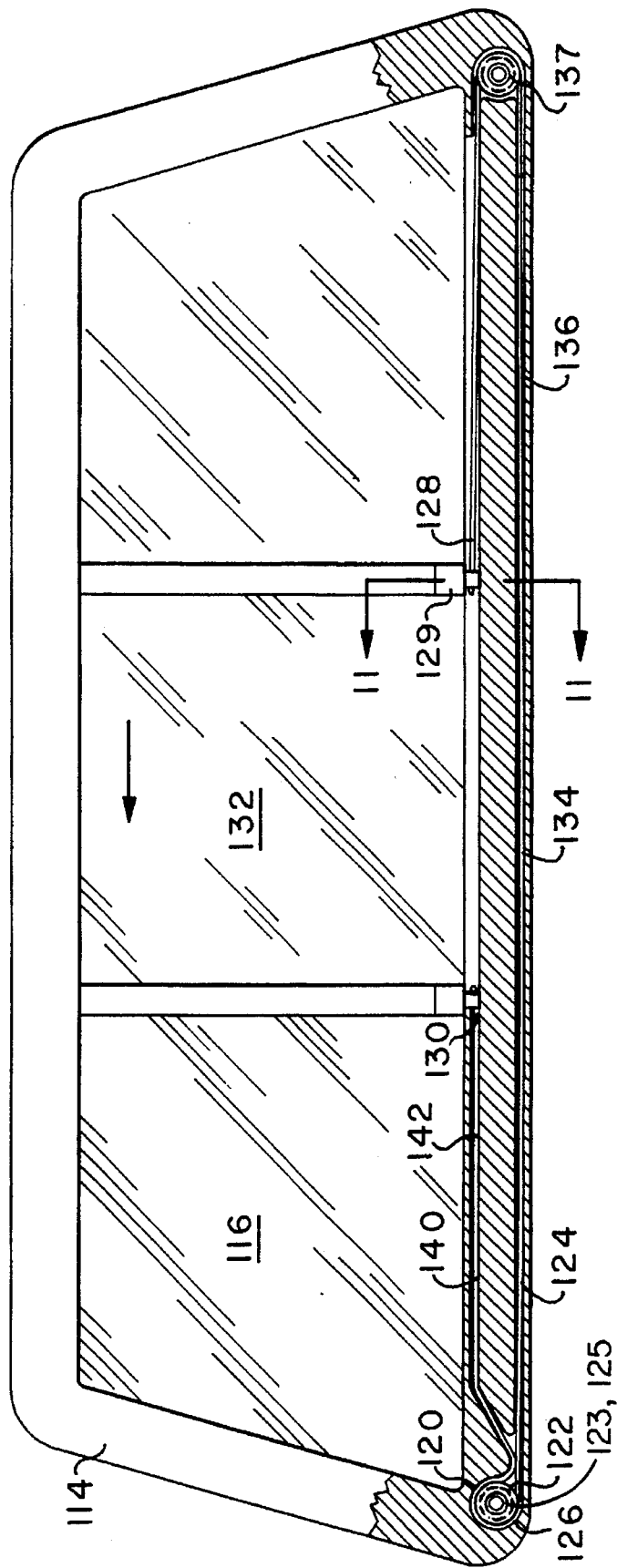
FIG. 10 is a schematic elevation view, partially in section, illustrating electric motor and pull/pull cable drive means for the sliding pane in accordance with one preferred embodiment.
Figure 11:
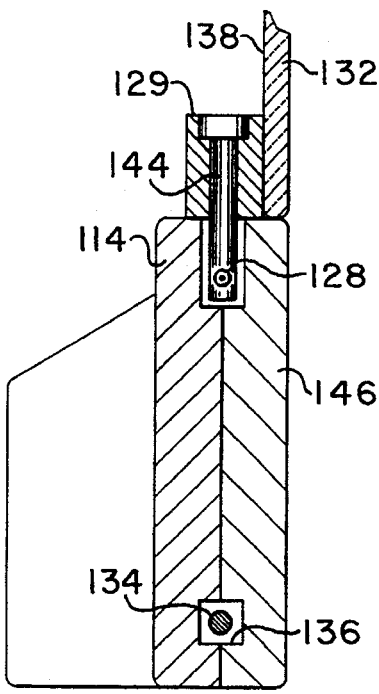
FIG. 11 is a section view taken through lines 11—11 of FIG. 10, illustrating features of the cable drive means.

As disclosed above, the pull/pull cable-and-drum drive mechanism is a significant feature of the window assembly. As best seen in FIGS. 10 and 11, the drive means of the preferred embodiment illustrated comprises an electric motor 120 which is operatively connected to the electrical system of the motor vehicle, preferably through an on/off switch manually controllable from the passenger compartment. The output shaft of the electric motor reversibly drives a cable-and-drum subassembly comprising a drive drum 122, and a drive cable 124. The drive drum preferably is mounted directly on and coaxial with the output shaft of the electric motor, as in the embodiment of FIG. 10. Alternatively, drive power from the electric motor can be transmitted to the drive drum via suitable linkage means in accordance with techniques well known to those skilled in the art.

In accordance with certain particularly preferred embodiments, the power drive means comprises a sensor to detect an obstruction encountered by the sliding pane as it moves toward its closed position. Upon detecting an obstruction, the electric motor reverses its drive direction to open the window. Such sensor can be provided as an electronic sensor incorporated into the electric motor to monitor the motor's amperage draw. In the preferred pull/pull cable arrangement illustrated there is substantially constant load on the motor in both directions (i.e., opening and closing) in normal, unobstructed operation of the sliding pane. Hence, a sensor and associated actuator can be set to reverse motor direction upon detecting amperage draw exceeding a preselected limit, e.g. plus or minus 0.5 amps from a 2.0 amp design value. Sensor 123 and actuator 125 are incorporated into electric motor 120 illustrated in FIG. 10. In this regard, it is a significant advantage of the pull/pull type cable-and-drum drive assembly disclosed here, that considerable drive force can be easily carried by the drive cable. The driving portion of the cable is always in tension, rather than being in compression when either opening or closing the sliding pane as in a push/pull mechanism using a sheathed cable. Thus, the pull/pull arrangement of the invention can be designed for constant load or force in both directions without concern for cable buckling limits.

Figure 10A:
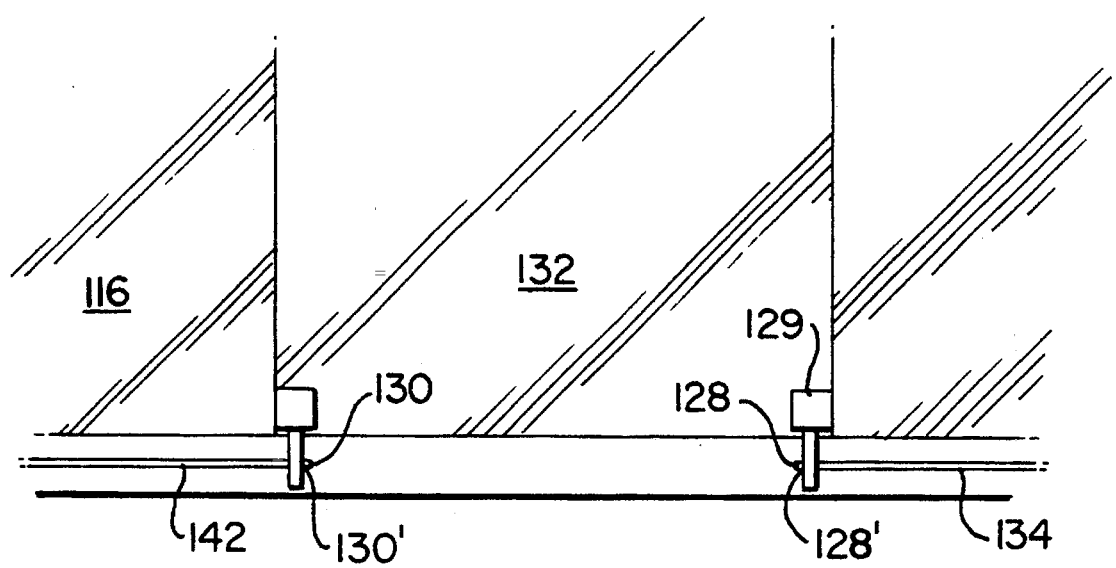
FIG. 10A is a schematic view corresponding to FIG. 10 and partially broken away, illustrating an alternative embodiment.

Electric motor 120 and drive drum 122 are seen in FIG. 10 to be mounted in a cylindrical recess 126 in frame 114 of the window assembly. Drive cable 124 is wrapped around the drive drum such that it is reversibly driven by rotation of the drive drum. A first cable end 128 is attached to the bottom of sliding pane 132 for pulling it to its closed position upon clockwise rotation (as viewed in FIG. 10) of drive drum 122. The opposite end of 130 of drive cable 124 is connected to the opposite lower corner of sliding pane 132, such that counterclockwise rotation of drive drum 122 pulls sliding pane 132 to its open position behind adjacent fixed pane 116. To provide smoother and more reliable operation, cable ends 128 and 130 preferably are connected to their respective points on sliding pane 132 by means of spring-buffered attachments. As illustrated in FIG. 10A, first end 128 of the drive cable, remote from the drive drum, has a spring-buffered attachment 128' to a first lower fixed member for pulling the sliding pane to the open position upon rotation of the drive drum in a first rotational direction, and second end 130 of the drive cable, remote from the drive drum, has a spring-buffered attachment 130' to a second lower fixed member for pulling the sliding pane to the closed position upon reverse rotation of the drive drum.

In accordance with a particularly advantageous aspect of the embodiment of FIG. 10, the opposite ends of the pull/pull drive cable 124 extend from drive drum 122 within parallel cable channels formed within the lower horizontal portion of frame 114. Thus, portion 134 of drive cable 124, which pulls sliding pane 132 to its closed position, travels in cable channel 136 from the drive drum to an idler pulley 137 mounted in a cylindrical recess in frame 114 remote from the drive drum mounting recess 126. Cable portion 134 then extends to cable end 128 affixed to attachment block 129 on the inside surface 138 of sliding pane 132. Separate, parallel cable channel 140 carries portion 142 of cable 124, which pulls sliding pane 132 to its open position behind fixed pane 116. For ease of assembly, maintenance and repair, the parallel cable channels and mounting recesses preferably are covered or even cooperatively formed in the frame by means of a cover plate 146 along the horizontally-extending lower portion of frame 114, as best seen in FIG. 11. Removable attachment pin 144 is seen in FIG. 11 to pass through attachment block 129 for spring-buffered connection to cable end 128.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

I claim:

1. A window assembly for a motor vehicle body enclosing a passenger compartment, the window assembly comprising, in combination:

structural frame means for mounting in a window opening of the vehicle body, comprising a circumferentially extending frame;

a sliding pane mounted to the frame means for sliding between a closed position in a first plane and an open position in an offset, substantially parallel second plane;

guide means for guiding the sliding pane as it moves in a path of travel between its open and closed positions, the guide means comprising kick-out means for forcibly guiding the sliding pane from the first plane toward the second plane substantially simultaneously with initial lateral movement of the sliding pane from its closed position toward its open position; and a cable-and-drum drive assembly comprising a drive cable wrapped around a drive drum and attached to the sliding pane for pulling the sliding pane open by rotation of the drive drum in a first rotational direction and for pulling the sliding pane closed by reverse rotation of the drive drum, the drive drum being rotatably mounted in a recess in the frame means and at least a portion of the drive cable extending between the sliding pane and the drive drum in a cable channel in the frame means.

2. The window assembly for a motor vehicle body in accordance with claim 1 wherein the sliding pane in its closed position is substantially flush with an adjacent fixed-position pane of the window assembly, and in its open position is behind and substantially overlapping the fixed-position pane.

3. The window assembly for a motor vehicle body in accordance with claim 1 wherein the drive cable has a first cable end, remote from the drive drum, attached to the bottom of the sliding pane for pulling it open upon rotation of the drive drum in the first rotational direction, and a second cable end, remote from the drive drum, attached to the bottom of the sliding pane for pulling it closed upon reverse rotation of the drive drum.

4. The window assembly for a motor vehicle body in accordance with claim 3 wherein the first and second cable ends are attached to the sliding pane by spring-buffered attachments.

5. The window assembly for a motor vehicle body in accordance with claim 1 wherein a first portion of the drive cable extends between the sliding pane and the drive drum in a first cable channel in the frame, and a second portion of the drive cable extends between the sliding pane and the drive drum in a second cable channel in the frame separated from and parallel to the first cable channel.

6. The window assembly for a motor vehicle body in accordance with claim 5 wherein the first cable channel and the second cable channel are formed in the bottom of the frame cooperatively by a recess in the frame and a cover plate attached to the frame over the recess.

7. The window assembly for a motor vehicle body in accordance with claim 1 wherein the drive assembly further comprises a manual switch actuated electrical motor having a reversibly driven output shaft operatively connected to the drive drum.

8. The window assembly for a motor vehicle body in accordance with claim 7 wherein the drive drum is mounted directly on the output shaft of the drive motor for fixed rotation therewith.

9. The window assembly for a motor vehicle body in accordance with claim 7 wherein the drive assembly further comprises a sensor to detect resistance to closure of the sliding pane beyond a preselected level and an actuator responsive to the sensor to reverse the drive direction of the drive drum.

10. The flush-closing multi-pane window assembly for a motor vehicle in accordance with claim 1 wherein the drive drum is mounted directly on the output shaft of a drive motor for fixed rotation therewith.

11. A flush-closing multi-pane window assembly for a motor vehicle body enclosing a passenger compartment, the window assembly comprising, in combination:

structural frame means for mounting in a window opening in the vehicle body, comprising a circumferentially extending frame;

at least one fixed-position pane mounted to the frame means;

at least one sliding pane mounted to the frame for sliding between a closed position in a first plane and an open position in an offset, substantially parallel second plane;

guide means for guiding the sliding pane as it moves in a path of travel between its open and closed positions, the guide means comprising kick-out means for forcibly guiding the sliding pane from the first plane toward the second plane substantially simultaneously with initial lateral movement of the sliding pane from its closed position toward its open position; and a cable-and-drum drive assembly comprising a rotatably mounted drive drum and a drive cable having at least one wrap around the drive drum, a first cable end, remote from the drive drum, attached to the sliding pane for pulling it open upon rotation of the drive drum in a first rotational direction, and a second cable end, remote from the drive drum, attached to the sliding pane for pulling it closed upon rotation of the drive drum in a second rotational direction, the drive drum being rotatably mounted in a recess formed in the frame, a first cable portion extending between the sliding pane and the drive drum in a first cable channel in the frame, and a second cable portion extending between the sliding pane and the drive drum in a second cable channel in the frame, the first and second cable channel extending parallel one another in a horizontally extending portion of the frame below the sliding pane.

12. A flush-closing multi-pane backlite assembly for a motor vehicle body enclosing a passenger compartment, the window assembly comprising, in combination:

structural frame means for mounting in a window recess in the vehicle body, comprising a full circumference frame;

at least one fixed-position pane mounted to the frame and having an outside surface;

at least one sliding pane having an outside surface and being mounted to the frame for sliding between a closed position in a first plane in which its outside surface is substantially flush with the outside surface of the fixed-position pane, and an open position behind and substantially overlapping the fixed-position pane, in an offset second plane substantially parallel to the first plane;

guide means for guiding the sliding pane as it moves in a path of travel between its open and closed positions, the guide means comprising upper guide channels in a first horizontal portion of the frame above the sliding pane and lower guide channels in a second horizontal portion of the frame below the sliding pane, upper fixed members extending from the sliding pane into the upper guide channels, and lower fixed members extending from the sliding pane into the lower guide channels, and kick-out means for engaging the fixed members at least during initial movement of the sliding pane in its path of travel from its closed position toward its open position, to forcibly guide the sliding pane from the first plane toward the second plane substantially simultaneously with said initial movement; and a cable-and-drum drive assembly comprising a drive cable having multiple wraps around a drive drum, a first end of the drive cable, remote from the drive drum, having a spring-buffered attachment to a first one of said lower fixed members for pulling the sliding pane to the open position upon rotation of the drive drum in a first rotational direction, and a second end of the drive cable, remote from the drive drum, having a spring-buffered attachment to a second one of the lower fixed members for pulling the sliding pane to the closed position upon reverse rotation of the drive drum, at least a portion of the drive cable extending between the sliding pane and the drive drum in a cable channel in the frame means.

13. The flush-closing multi-pane window assembly for a motor vehicle in accordance with claim 12, wherein the kick-out means comprises fixed ramp surfaces in the frame means.

14. The flush-closing multi-pane window assembly for a motor vehicle in accordance with claim 13 wherein the ramp surfaces define, in part, the guide channels.

15. The flush-closing multi-pane window assembly for a motor vehicle in accordance with claim 14 wherein the frame comprises a unitary, full-circumference molded plastic member in which the guide channels, including the ramp surfaces, are molded-in recesses.

16. The flush-closing multi-pane window assembly for a motor vehicle in accordance with claim 12 wherein the kick-out means comprises pivoting cams mounted for arcuate movement in a plane substantially perpendicular to the sliding pane while engaging corresponding ones of the fixed members.

17. The flush-closing multi-pane window assembly for a motor vehicle in accordance with claim 12 having first and second fixed-position panes substantially flush with each other, the sliding pane in its closed position being between, and substantially flush with both of, the fixed-position panes.

18. The flush-closing multi-pane window assembly for a motor vehicle in accordance with claim 12 further comprising drive means connected to the sliding pane for moving it between its open and closed position, wherein the drive means comprises an electric motor having a reversibly rotatable output shaft, the electric motor being operatively connectable to an electrical system of the motor vehicle through an on/off switch manually controllable from the passenger compartment.

* * * * *